(12) United States Patent
Kim (10) Patent No.: US 10,860,502 B2
(45) Date of Patent: Dec. 8, 2020

(54) MEMORY SYSTEM

(71) Applicant: SK hynix Inc., Icheon (KR)

(72) Inventor: Chang Hyun Kim, Seoul (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/282,166

(22) Filed: Feb. 21, 2019

(65) Prior Publication Data

US 2020/0159678 A1   May 21, 2020

(30) Foreign Application Priority Data

Nov. 21, 2018 (KR) ........................ 10-2018-0144289

(51) Int. Cl.
| | |
|---|---|
| *G06F 13/16* | (2006.01) |
| *H04L 12/879* | (2013.01) |
| *G06F 12/0804* | (2016.01) |
| *H04L 29/06* | (2006.01) |

(52) U.S. Cl.
CPC ...... *G06F 13/1668* (2013.01); *G06F 12/0804* (2013.01); *H04L 49/901* (2013.01); *H04L 69/22* (2013.01); *G06F 2212/608* (2013.01); *G06F 2213/24* (2013.01)

(58) Field of Classification Search
CPC combination set(s) only.
See application file for complete search history.

(56) References Cited

U.S. PATENT DOCUMENTS

| | | | |
|---|---|---|---|
| 5,757,795 A * | 5/1998 | Schnell | H04L 45/745 370/392 |
| 7,899,052 B1 | 3/2011 | Hao et al. | |
| 9,952,925 B2 | 4/2018 | Lea et al. | |
| 9,983,821 B2 | 5/2018 | Sala et al. | |
| 2013/0265883 A1* | 10/2013 | Henry | H04L 43/0876 370/241 |
| 2014/0115579 A1 | 4/2014 | Kong | |
| 2014/0208022 A1 | 7/2014 | Gordon | |
| 2016/0283303 A1 | 9/2016 | Sharma et al. | |
| 2017/0091003 A1 | 3/2017 | Das Sharma et al. | |
| 2017/0358327 A1 | 12/2017 | Oh et al. | |
| 2017/0364287 A1 | 12/2017 | Antony et al. | |

(Continued)

FOREIGN PATENT DOCUMENTS

| | | | | |
|---|---|---|---|---|
| EP | 0464848 A2 * | 1/1992 | ............. | G06F 13/28 |

OTHER PUBLICATIONS

Notice of Allowance dated Aug. 5, 2020 for U.S. Appl. No. 16/367,700.

*Primary Examiner* — Henry Tsai
*Assistant Examiner* — Juanito Borromeo (57) ABSTRACT

A memory system is disclosed, which relates to technology for implementing data communication between memory devices. The memory system includes a plurality of memory devices and a memory controller. The memory devices allow a data packet composed of data and header information to be directly communicated between the memory devices. The memory controller transmits the data packet to a source memory device from among the plurality of memory devices, and receives the data packet from a last memory device from among the plurality of memory devices. Each of the memory devices hashes the header information such that the data is accessed, using a result of the hash, in address regions located at different positions.

19 Claims, 10 Drawing Sheets

(56) References Cited

U.S. PATENT DOCUMENTS

| | | |
|---|---|---|
| 2017/0364428 A1 | 12/2017 | Ganesan et al. |
| 2018/0225254 A1 | 8/2018 | Hu et al. |
| 2020/0026469 A1 | 1/2020 | Gao et al. |

\* cited by examiner

MEMORY SYSTEM

CROSS-REFERENCE TO RELATED APPLICATION

This application claims priority based upon Korean patent application No. 10-2018-0144289, filed on Nov. 21, 2018, the disclosure of which is hereby incorporated in its entirety by reference herein.

BACKGROUND OF THE INVENTION

1. Technical Field

Embodiments of the present disclosure may generally relate to a memory system, and more particularly to a technology for implementing data communication between memory devices.

2. Related Art

In recent times, various mobile communication terminals, for example, smartphones, tablet PCs, etc. have been widely used throughout the world. In addition, demand for a Social Network Service (SNS), a Machine to Machine (M2M) service, a sensor network, etc. from anywhere at any time is rapidly increasing. Therefore, the amount of data, the creation speed of data, and diversity of data are geometrically increasing. In order to process big data, a data processing rate of each memory is of importance and a high-capacity memory device and a high-capacity memory module are also needed.

Therefore, a memory system includes a plurality of memory devices to increase storage capacity. The memory devices of the memory system may be coupled to a controller by sharing data lines therebetween. However, when a large number of memory devices are contained in the memory system, a data loading time is rapidly increasing. In addition, during data communication between the controller and the memory devices, data transfer time and power consumption increase.

BRIEF SUMMARY OF THE INVENTION

Various embodiments of the present disclosure are directed to providing a memory system that substantially obviates one or more issues due to limitations and disadvantages of the related art.

The embodiments of the present disclosure relate to a memory system for implementing direct communication of data between memory devices, and transmitting the data formed in a packet format without designating an address of the data.

In accordance with an embodiment of the present disclosure, a memory system includes a plurality of memory devices configured to allow a data packet composed of data and header information to be directly communicated between the plurality of memory devices, and a memory controller configured to transmit the data packet to a source memory device from among the plurality of memory devices, and receive the data packet from a last memory device from among the plurality of memory devices. Each of the memory devices may be configured to hash the header information to produce a hash address such that the data is accessed, using the hash address, in address regions located at different positions.

It is to be understood that both the foregoing general description and the following detailed description of the present disclosure are illustrative and explanatory and are intended to provide further explanation of the disclosure as claimed.

BRIEF DESCRIPTION OF THE DRAWINGS

The above and other features and advantages of the present disclosure will become readily apparent by reference to the following detailed description when considered in conjunction with the accompanying drawings wherein.

DESCRIPTION OF EMBODIMENTS

Reference will now be made in detail to embodiments of the present disclosure, examples of which are illustrated in the accompanying drawings. Wherever possible, the same reference numbers are used throughout the drawings to refer to the same or like portions. Throughout the specification of the present disclosure, if it is assumed that a certain part is connected (or coupled) to another part, the term "connection or coupling" means that the certain part is directly connected (or coupled) to another part and/or is electrically connected (or coupled) to another part through the medium of a third party. Throughout the specification of the present disclosure, if it is assumed that a certain part includes a certain component, the term "comprising or including" means that a corresponding component may further include other components unless a specific meaning opposed to the corresponding component is written. As used in the specification and appended claims, the terms "a", "an", "one", "the" and other similar terms include both singular and plural forms, unless context clearly dictates otherwise. The terms used in the present application are merely used to describe specific embodiments and are not intended to limit the present disclosure. A singular expression may include a plural expression unless otherwise stated in the context.

Figure 1:
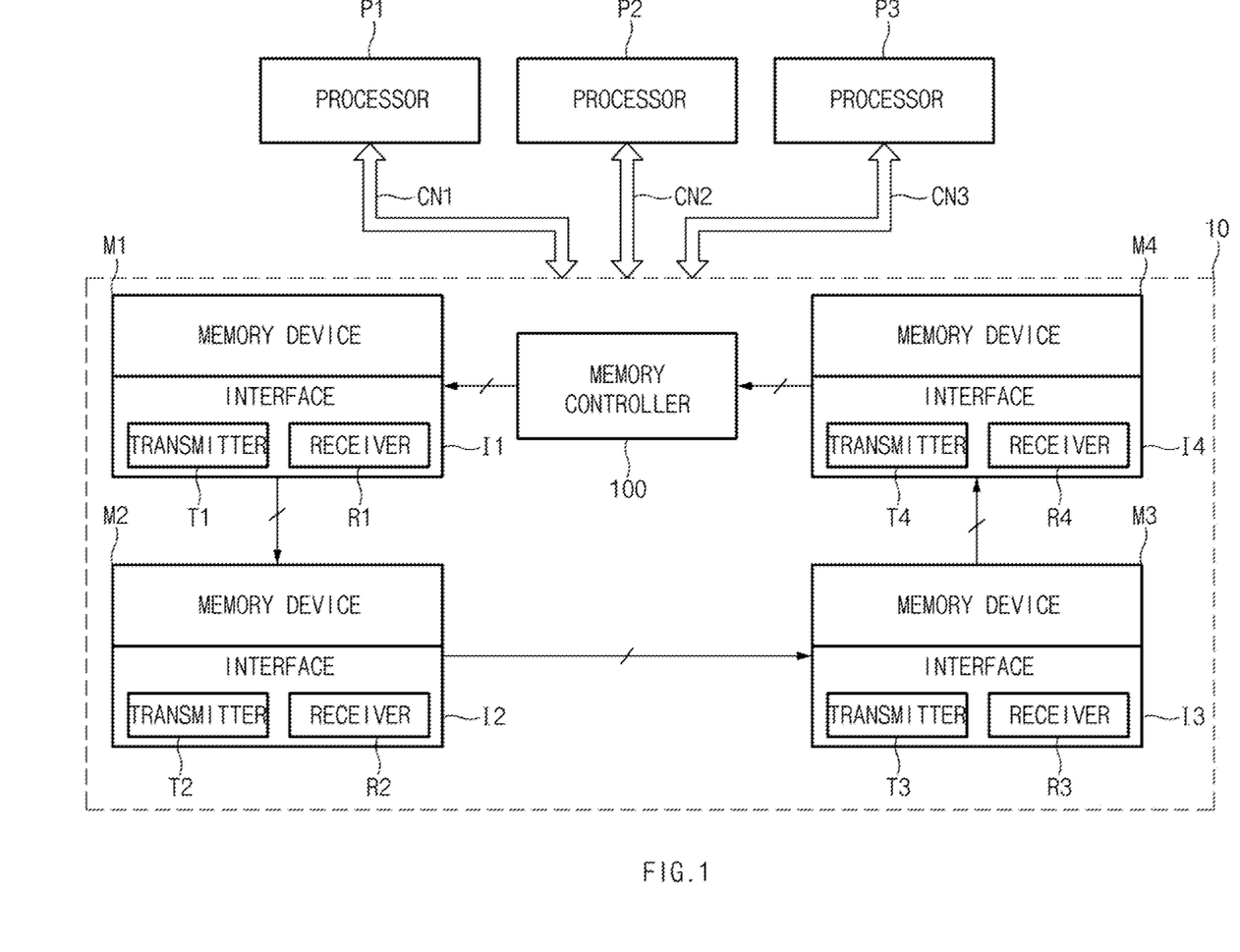
FIG. 1 is a block diagram illustrating a memory system according to an embodiment of the present disclosure.

FIG. 1 is a block diagram illustrating a memory system 10 according to an embodiment of the present disclosure.

The memory system 10 may include a memory controller 100 and a plurality of memory devices M1, M2, M3 and M4.

The memory controller 100 may analyze and process commands requested by the processors P1, P2, and/or P3. In this case, the commands requested by the processors P1 through P3 may include a write command to write data in the memory devices M1 through M4, a read command to read data stored in the memory devices M1 through M4, and the like. Upon receiving the commands from the processors P1 through P3, the memory controller 100 may control operations of background functional blocks using firmware or software needed to drive the memory devices M1 through M4.

The memory controller 100 may be coupled to the processor P1 through a channel CN1. The memory controller 100 may be coupled to the processor P2 through a channel CN2. The memory controller 100 may be coupled to the processor P3 through a channel CN3. In this case, each of the channels CN1 through CN3 may include a data bus through which data is transmitted and received, and a control bus through which a control signal is transmitted and received.

The memory controller 100 may transmit a data packet (to be described later) received through any of the channels CN1 through CN3 to the memory device M1 (i.e., source memory device). The memory controller 100 may transmit a data packet received from the memory device M4 (i.e., the last memory device) to the processor P1 through the channel CN1. The memory controller 100 may transmit the data packet received from the memory device M4 (i.e., the last memory device) to the processor P2 through the channel CN2. The memory controller 100 may transmit a data packet received from the memory device M4 (i.e., the last memory device) to the processor P3 through the channel CN3. In addition, the memory controller 100 may transmit the data packet received from the memory device M4 to the memory device M1.

The memory controller 100 may control operations of the plurality of memory devices M1 through M4. The memory devices M1 through M4 may be configured in a manner that a data packet can be directly communicated between the memory devices M1 through M4 without passing through the memory controller 100. Therefore, the memory controller 100 may transmit the data packet received through any of the channels CN1 through CN3 to the memory device M1, and may transmit the data packet received from the memory device M4 to any of the channels CN1 through CN3.

The memory devices M1 through M4 may be configured in a manner that a data packet can be communicated between the memory devices M1 through M4 without passing through the memory controller 100. In other words, the memory devices M1 through M4 may store data packets received from different memory devices M1 through M4 therein, or may read the stored data packet and transmit the read data packet to different memory devices M1 through M4.

For example, the memory device M1 may store a data packet received from the memory controller 100, or may transmit the stored data packet to the memory device M2. The memory device M2 may store a data packet received from the memory device M1, or may transmit the stored data packet to the memory device M3. The memory device M3 may store a data packet received from the memory device M2, or may transmit the stored data packet to the memory device M4. The memory device M4 may store a data packet received from the memory device M3, or may transmit the stored data packet to the memory controller 100.

Although the embodiment of the present disclosure has exemplarily disclosed that first through fourth memory devices M1 through M4 are used for convenience of description and better understanding of the present disclosure, the scope or spirit of the present disclosure is not limited thereto, the number of memory devices is not limited thereto, and the number of memory devices may also be changed as necessary.

In addition, each of the memory devices M1 through M4 according to this embodiment may be formed of a volatile memory. However, the scope or spirit of the present disclosure is not limited thereto, and each of the memory devices M1 through M4 may be implemented as any one of a NAND flash memory, a NOR flash memory, a Phase-Change RAM (PCRAM), a Ferroelectric RAM (FRAM), a Magnetic RAM (MRAM), etc.

The plurality of memory devices M1 through M4 may respectively include a plurality of interfaces I1 through I4 for implementing direct data packet communication between the memory devices M1 through M4.

In this case, the interface I1 of the memory device M1 may include a receiver R1 and a transmitter T1. The receiver R1 may receive a data packet from the memory controller 100. The transmitter T1 may transmit a data packet to the memory device M2.

The interface I2 of the memory device M2 may include a receiver R2 and a transmitter T2. The receiver R2 may receive a data packet from the memory device M1. The transmitter T2 may transmit a data packet to the memory device M3.

The interface I3 of the memory device M3 may include a receiver R3 and a transmitter T3. The receiver R3 may receive a data packet from the memory device M2. The transmitter T3 may transmit a data packet to the memory device M4.

The interface I4 of the memory device M4 may include a receiver R4 and a transmitter T4. The receiver R4 may receive a data packet from the memory device M3. The transmitter T4 may transmit a data packet to the memory controller 100.

Figure 2:
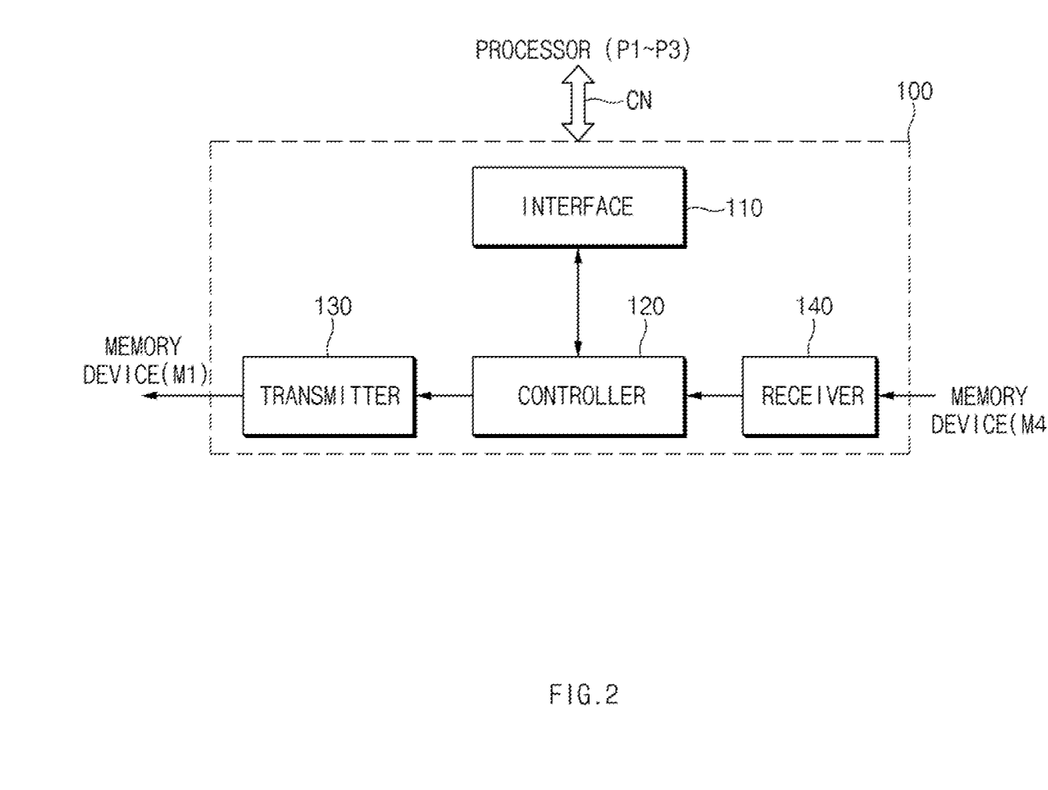
FIG. 2 is a block diagram illustrating a memory controller shown in FIG. 1 according to an embodiment of the present disclosure.

FIG. 2 is a block diagram illustrating the memory controller 100 shown in FIG. 1.

The memory controller 100 may include an interface 100, a controller 120, a transmitter 130, and a receiver 140.

The interface 110 may interface with the external processors P1 through P3 through one or more channels CN. That is, the interface 110 may transmit a data packet received from any of the processors P1 through P3 to the controller 120, or may transmit a data packet received from the controller 120 to any of the processors P1 through P3.

The controller 120 may mediate the access operation between the memory device M1 and the memory device M4, such the memory devices M1 and M4 can be accessed through the mediation of the controller 120. In more detail, the controller 120 may transmit a data packet received through the interface 110 to the transmitter 130. The controller 120 may transmit a data packet received from the receiver 140 to the interface 110. The controller 120 may mediate between transmission/reception (Tx/Rx) operations of data packets such that one data packet received through the interface 110 is prevented from colliding with another data packet received from the receiver 140 through the mediation of the controller 120.

The transmitter 130 may transmit a data packet received from the controller 120 to the memory device M1. The receiver 140 may receive a data packet from the memory device M4, and may transmit the received data packet to the controller 120.

Figure 3:
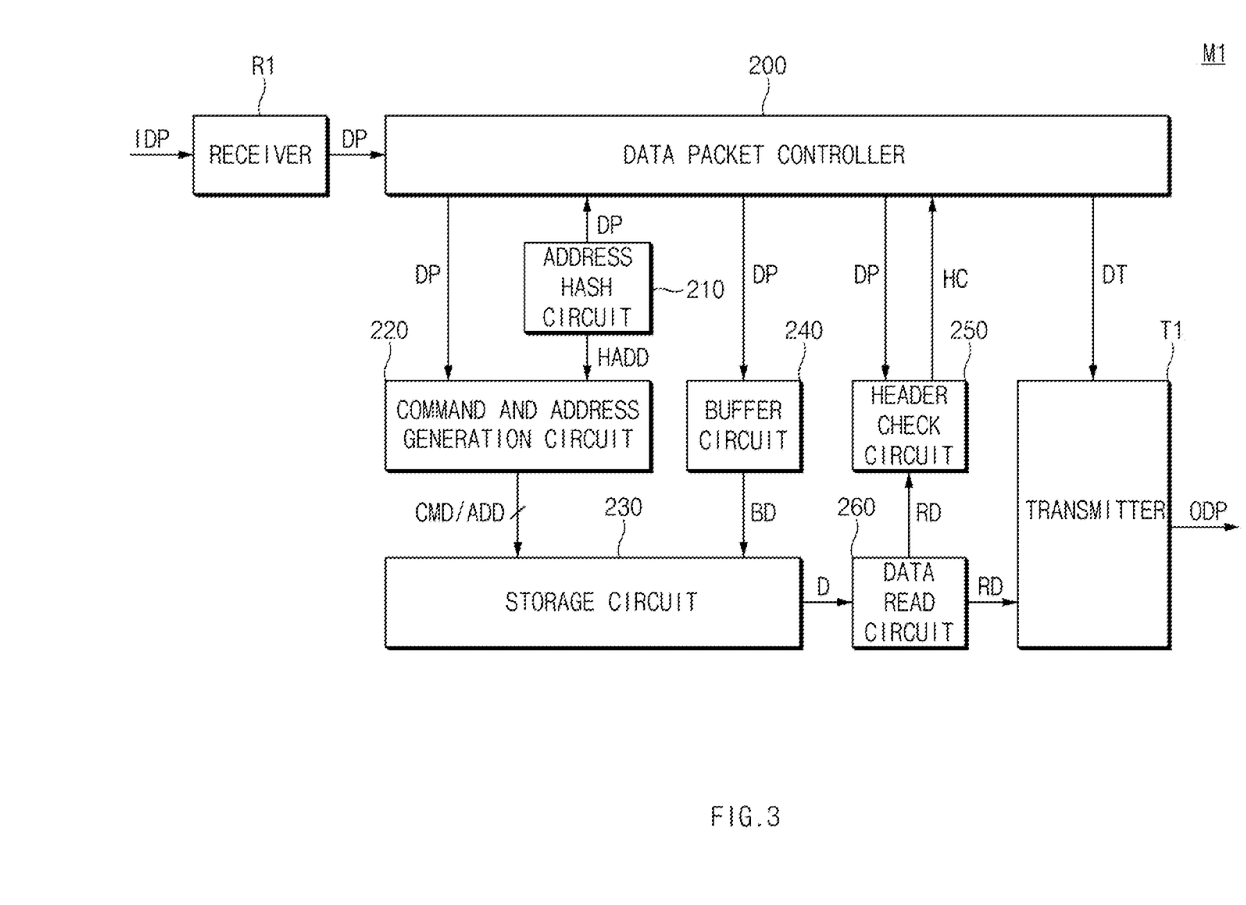
FIG. 3 is a block diagram illustrating a memory device shown in FIG. 1 according to an embodiment of the present disclosure.

FIG. 3 is a detailed block diagram illustrating an example of one memory device M1 from among the memory devices M1 through M4 shown in FIG. 1. The memory devices M1 through M4 may be identical in structure to each other, such that only one memory device M1 is shown in FIG. 3 for convenience of description, and the following embodiment will hereinafter be described with reference to a detailed structure of the memory device M1 as an example.

The memory device M1 may include a data packet controller 200, an address hash circuit 210, a command and address generation circuit 220, a storage circuit 230, a buffer circuit 240, a header check circuit 250, a data read circuit 260, a receiver R1, and a transmitter T1.

The receiver R1 may receive a data packet IDP from the memory controller 100, and may transmit a data packet DP to the data packet controller 200. The data packet controller 200 may control internal operations of the memory device M1 in response to the data packet DP received from the receiver R1.

In other words, the data packet controller 200 may receive the data packet DP from the receiver R1, and may transmit the data packet DP to internal constituent elements of the memory device M1. In this case, the data packet DP may include data and header information. The data packet controller 200 may establish or change queue information (to be described later) of the memory device M1 in response to a header check signal HC received from the header check circuit 250. In addition, the data packet controller 200 may generate a packet transmission signal DT needed to transmit a data packet to the subsequent memory device M2.

The address hash circuit 210 may perform address hashing in response to the data packet DP received from the data packet controller 200, and may generate a hash address HADD. In more detail, the address hash circuit 210 may generate a random physical address (for example, pseudo-random physical address) by hashing header information contained in the data packet DP, and output the pseudo-random physical address as the hash address HADD. Detailed operations of the address hash circuit 210 will be described later with reference to FIG. 4.

The command and address generation circuit 220 may generate, using the header information of the data packet DP, a command CMD and an address ADD, which are needed to store data in response to the data packet DP and the hash address HADD. The storage circuit 230 may store data BD received from the buffer circuit 240 in response to the command CMD and the address ADD. The buffer circuit 240 may buffer the data of the data packet DP, such that the buffer circuit 240 may transmit the buffered data BD to the storage circuit 230.

The header check circuit 250 may check header information by comparing the data packet DP with read data RD received from the data read circuit 260, and may output a header check signal HC to the data packet controller 200. The data read circuit 260 may read data D stored in the storage circuit 230, and may output the read data RD to the header check circuit 250. In addition, the data read circuit 260 may also output the read data RD to the transmitter T1 as necessary.

The transmitter T1 may receive the read data RD from the data read circuit 260. The transmitter T1 may transmit a data packet ODP to the subsequent memory device M2 in response to the data packet transmission signal DT received from the data packet controller 200.

When the memory system 10 receives physical addresses from the processors P1 through P3 and performs mapping of addresses of the memory devices M1 through M4 by referring to a mapping table, the memory system 10 may have difficulty in accessing the respective memory devices M1 through M4. When the memory system 10 flushes or reads designated data to or from any memory device located far from the processors P1 through P3, a data loading time may be increased and a data transfer rate may be reduced.

Therefore, the memory system 10 according to the embodiment may not designate an address corresponding to a fixed location in one of the memory devices M1 through M4 as where to store data, and may instead transmit the data and address formed in a packet format to a desired destination. Accordingly, the memory system 10 according to the embodiment may perform address hashing using information of the data packet DP, such that addresses can be pseudo-randomly designated for the respective memory devices. In addition, the memory system 10 according to the embodiment may store requested data in the first memory device M1 located nearest to the memory controller 100. As a result, the memory system 10 according to the embodiment may easily access desired data, and may increase a data transfer rate while simultaneously reducing a data loading time in a data flushing process or a data reading process.

Detailed operations of the memory device M1 having the above-mentioned constituent elements are as follows.

First of all, in the read operation for reading data from the memory device M1, the data packet controller 200 may receive the data packet DP having a queue field indicating "Read Request". The address hash circuit 210 may generate the hash address HADD based on header information contained in the data packet DP.

Thereafter, in response to the command CMD and address ADD generated by the command and address generation circuit 220, the memory device M1 may read data D stored in the storage circuit 230. In this case, the address ADD may be of an address layer pseudo-randomly established by the hash address HADD. The storage circuit 230 may read the data D from a pseudo-random address layer as the number of the address ADD increases by one; that is, through the operation of the hash function, locations that appear sequential outside of the memory device M1 may be distributed pseudo-randomly among the values of the address ADD. The data read circuit 260 may receive the data D as an input, and may transmit the read data RD to the header check circuit 250.

Subsequently, the header check circuit 250 may generate a header check signal HC indicating whether header information of the requested data packet DP is identical to information of the read data RD. For example, when the read data RD is in the format 500 of FIG. 5, below, and the data packet DP is in the format 600 of FIG. 6, below, the header check circuit 250 may indicate identical information when all of the address layer number field 504, process ID field 506, and virtual address field 508 of the read data RD have values respectively is equal to values of the address layer number field 604, process ID field 606, and virtual address field 608 of the data packet DP. In an embodiment, the header check circuit 250 also checks the valid information field 502 of the read data RD, and requires that the valid information field 502 indicate valid as an additional condition to indicating identical information. The data packet controller 200 may receive the header check signal HC. If the header check signal HC indicates that the valid information field 502 header information of the requested data packet DP is identical to the corresponding information of the read data RD, the data packet controller 200 may change a current queue field of the data packet DP to indicate "Read Data".

Thereafter, the read data RD received from the data read circuit 260 may be transmitted to the transmitter T1. The data packet controller 200 may activate the data packet transmission signal DT. When the data packet transmission signal DT is activated, the transmitter T1 may transmit the data packet ODP to the subsequent memory device M2. When the header check signal HC indicated identical information, the data packet ODP, if formatted according to FIG. 6, below, may have a queue field 602 indicating "Read Data", a data field 610 equal to the data field 510 of the read data RD, and an address layer number field 604, process ID field 606, and virtual address field 608 having values respectively equal to the corresponding fields of the data packet DP.

If the requested data is read from the first memory device M1, the remaining memory devices M2~M4 may bypass the read operation without execution of the read operation. In more detail, the first memory device M1 may read the data D of the storage circuit 230 through the above-mentioned read operation. The remaining memory devices M2~M4 may allow the data packet controller 200 to immediately activate the data packet transmission signal DT without execution of the above-mentioned read operation. As a result, the remaining memory devices M2~M4 may allow the data packet DP received through the receiver R1 to be immediately bypassed through the transmitter T1, such that the data packet ODP can be transmitted to the memory controller 100.

On the other hand, in the write operation for writing data in the memory device M1, the data packet controller 200 may receive the data packet DP having a queue field indicating "Write Back". The data packet controller 200 may store the received data packet DP in the buffer circuit 240. The address hash circuit 210 may generate the hash address HADD based on header information contained in the data packet DP.

Thereafter, in response to the command CMD and address ADD generated by the command and address generation circuit 220, the memory device M1 may read data D stored in the storage circuit 230. The data read circuit 250 may receive the data D as an input, and may transmit the read data RD to the header check circuit 250.

Subsequently, the header check circuit 250 may check header information of the read data RD, and may generate and transmit the header check signal HC to the packet controller 200. The data packet controller 200 may analyze the header check signal HC. If a valid information bit indicating whether data has already been stored is set to zero "0" (i.e., a disable state), the data packet controller 200 may perform the data write operation. That is, data stored in the buffer circuit 240 may be stored in the storage circuit 230. In addition, in an embodiment, the data packet controller 200 may also perform the data write operation when the valid information indicating whether data has already been stored is set to "1" (i.e., an enable set), and the header check signal HC indicates that information in the header of the data packet DP is equal to corresponding information in the read data RD, as described above for when the queue field indicated "Read Request".

In this case, the address ADD is pseudo-randomly established by the hash address HADD and the address (ADD) number increases by one, such that data BD can be written in the pseudo-random address region. That is, the data BD is written using a value for the address ADD that is one more than the value of the address AD that was used to read the read data RD.

Figure 4:
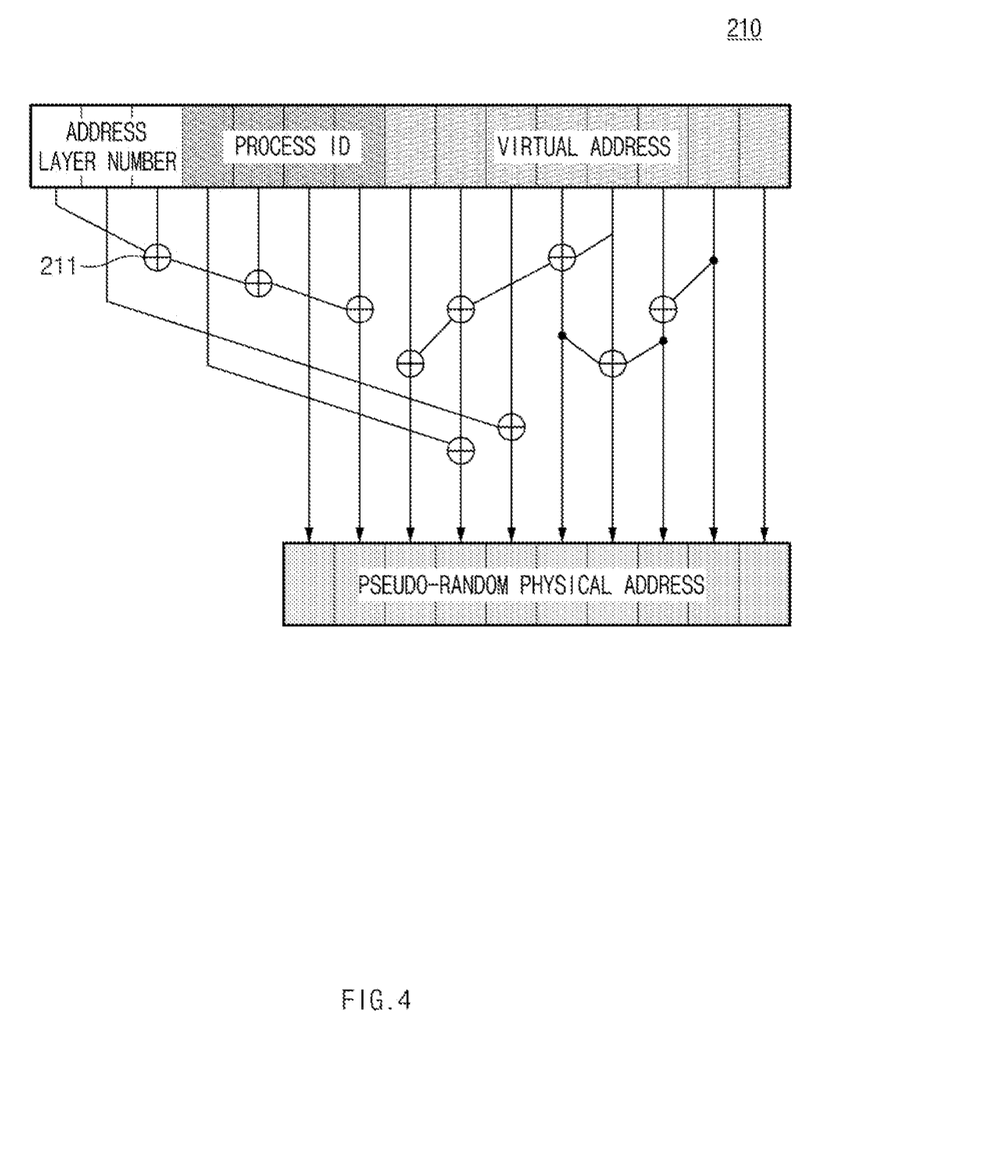
FIG. 4 is a conceptual diagram illustrating an address hash circuit shown in FIG. 3 according to an embodiment of the present disclosure.

FIG. 4 is a conceptual diagram illustrating operations of the address hash circuit 210 shown in FIG. 3.

Referring to FIG. 4, the address hash circuit 210 may perform address hashing in response to the data packet DP received from the data packet controller 200, and may generate the hash address HADD. In other words, the address hash circuit 210 may hash header information consisting of an address layer number, a process ID, and a virtual address, and may thus generate a pseudo-random physical address. In this case, the process ID and the virtual address may be established by one of the processors P1 through P3.

The address hash circuit 210 may include a logic operation circuit 211 which is configured to pseudo-randomly generate a physical address by performing a logic operation among the address layer number, the process ID, and the virtual address. For example, the logic operation circuit 211 may include an exclusive-OR (XOR) logic element configured to perform an XOR logic operation among respective bits of the address layer number, the process ID, and the virtual address, resulting in formation of a pseudo-random physical address. As a result, the respective memory devices M1 through M4 may allow data to be stored in the respective address regions located at different physical positions, such that the data can be stored in the respective address regions located at physically different positions within the memory devices M1 through M4. In the example shown in FIG. 4, wherein the logic operation circuit 211 performs an XOR operation, the two rightmost bits of the pseudo-random physical address are equal to the two rightmost bits of the virtual address, the third from the right bit is equal to the XOR of the second and third bits of the virtual address, the sixth from the right bit is equal to the XOR of the sixth bit of the virtual address and the second bit of the address layer number, and so on.

Figure 5:
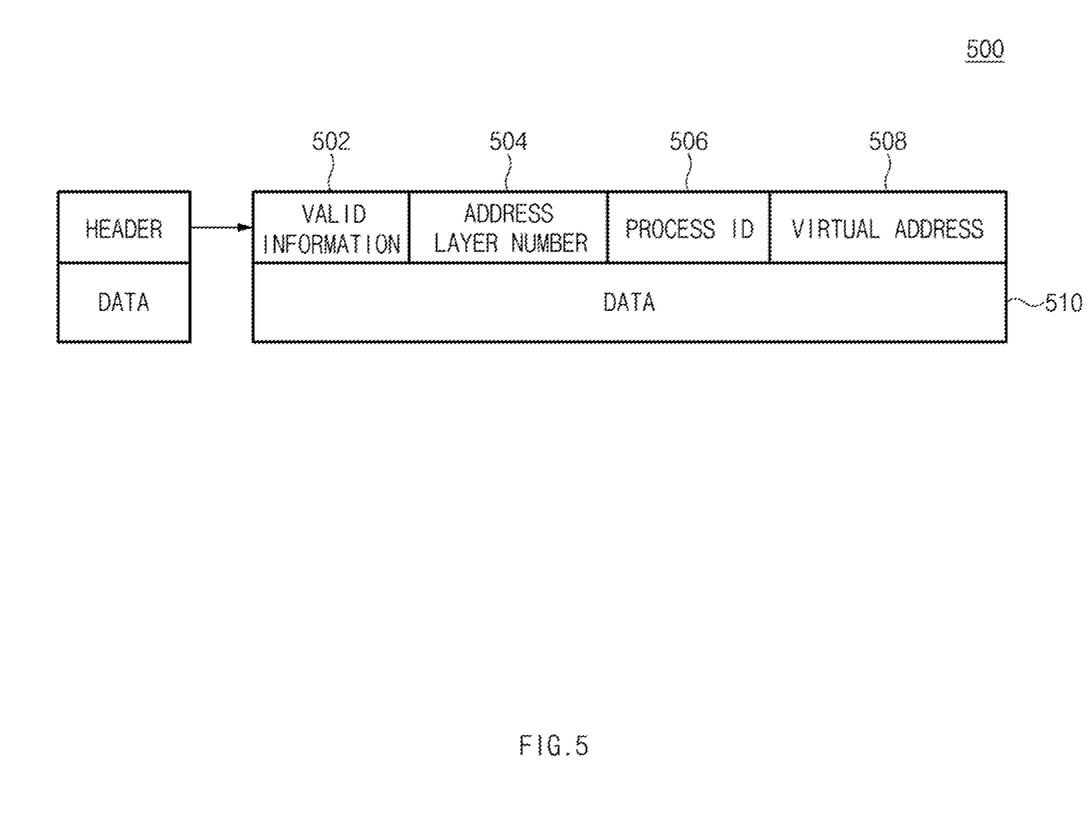
FIG. 5 is a schematic diagram illustrating a data storage format stored in each memory device shown in FIG. 1 according to an embodiment of the present disclosure.

FIG. 5 is a schematic diagram illustrating an example of a data storage format 500 stored in each of the memory devices M1 through M4 shown in FIG. 1. When data is stored in each of the memory devices M1 through M4, the data may be formed in a data format 500 shown in FIG. 5 such that the resultant data provided with the data format 500 of FIG. 5 may be stored in each memory device M1 through M4.

The data format 500 stored in each memory device M1 through M4 may include data 510 and header information. In this case, the term "data" may refer to data stored in each memory device M1 through M4, and the term "header information" may include a valid information field 502, an address layer number field 504, a process ID field 506, a virtual address field 508, etc.

The valid information field 502 may indicate whether data can be stored in each memory device M1 through M4. In order to store data in each memory device M1 through M4, the valid information field may check a bit of the valid information 502 to determine whether the valid information 502 is valid. As a result, when the valid information 502 is not valid, data can be stored in the corresponding memory device.

For example, if the bit of the valid information 502 is set to zero "0", this means that data can be stored in the corresponding memory device at that position. In contrast, if the bit of the valid information 502 is set to "1", this means that the corresponding memory device has already included prestored data such that the corresponding memory device may be unable to store any more data at that position.

The address layer number field 504 may indicate the number of a target address to be used for data storage within the respective memory devices M1 through M4. In accordance with the memory system 10 of this embodiment, an address region to be used for data storage may be pseudo-randomly determined by the address hash circuit 210. Therefore, data can be stored in the respective address regions located at different positions within the respective memory devices M1 through M4.

For example, in the memory device M1, the address layer number may be set to "1". In the memory device M2, the address layer number may be set to "2". In the memory device M3, the address layer number may be set to "3". In the memory device M4, the address layer number may be set to "4". However, the scope or spirit of the present disclosure is not limited thereto, and the data storage position within each of the memory devices M1 through M4 may be arbitrarily changed as necessary.

The process ID field 506 may indicate a unique number of a specific processor which has requested a data service from one memory device selected from among the plurality of processors P1 through P3. In addition, the virtual address field 508 may be an address used to pseudo-randomly generate the physical address to be used for data storage within each of the memory devices M1 through M4.

Figure 6:
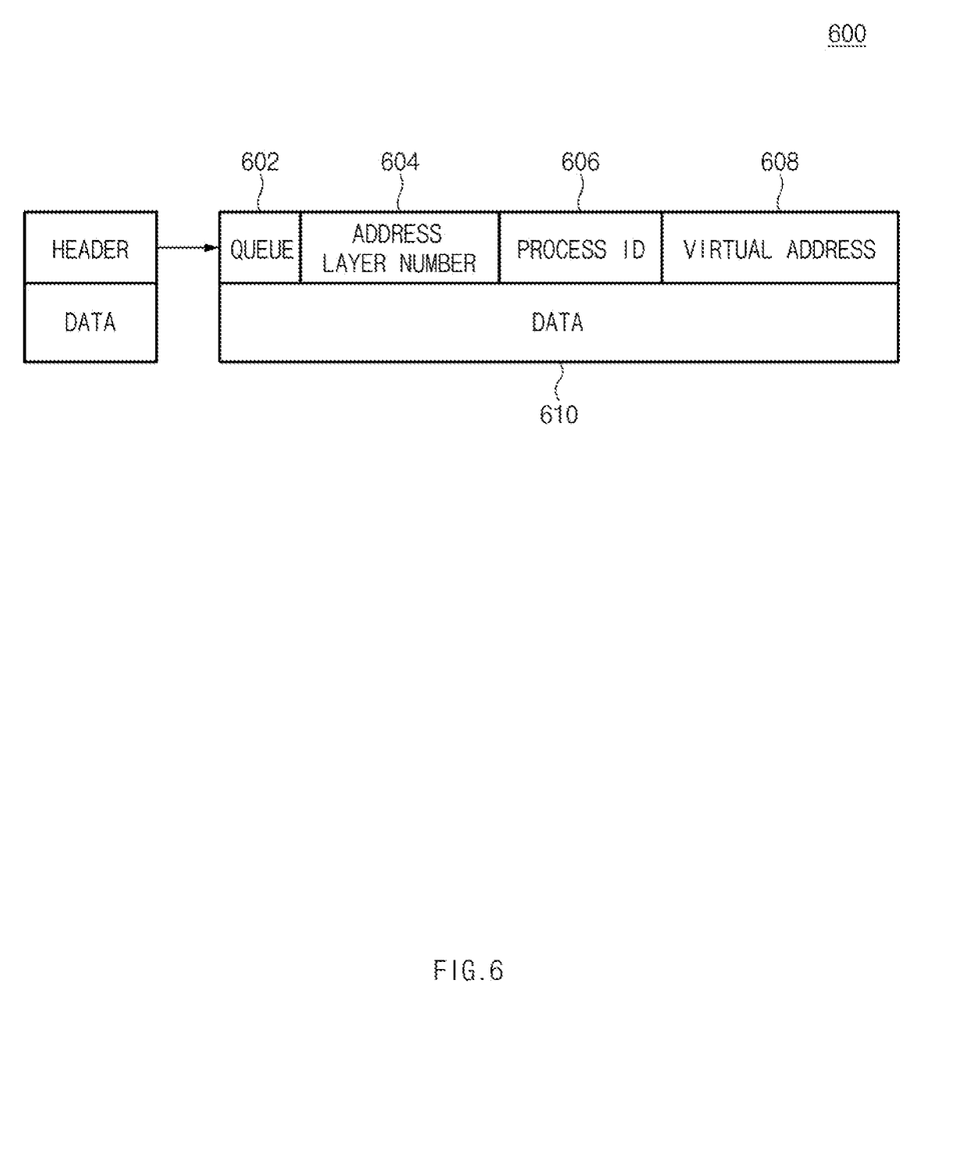
FIG. 6 is a schematic diagram illustrating a data stream format communicated between the respective memory devices shown in FIG. 1 according to an embodiment of the present disclosure.

FIG. 6 is a schematic diagram illustrating an example of a data stream format 600 (that is, a format of a data packet) communicated between the respective memory devices M1 through M4 shown in FIG. 1. When data is communicated between the respective memory devices M1 through M4, data may be formed in a data format 600 shown in FIG. 6, such that the resultant data provided with the data format 600 of FIG. 6 may be communicated between the respective memory devices M1 through M4.

The data format communicated between the respective memory devices M1 through M4 may include data 610 and header information. In this case, the header information may include a queue information field 602, an address layer number field 604, a process ID field 606, a virtual address field 608, etc.

The queue information may indicate operational information of data that is communicated between the respective memory devices M1 through M4. The queue information field 602 may include one of "Read Request", "Read Data", "Write Back", etc. "Read Request" indicates that the communication is a request for reading data that is communicated between the respective memory devices M1 through M4. "Read Data" indicates that the communication is carrying stored data that has been read from one of the memory devices M1 through M4. "Write Back" indicates that the communication is a request for storing data in one of the memory devices M1 through M4.

In accordance with this embodiment, the memory controller 100 may transmit the "Read Request" communications and the "Write Back" communications to the memory device M1. The memory controller 100 may transmit the "Read Data" communication received from the memory device M4 to the corresponding processor established by header information. In addition, in an embodiment the memory device M4 may retransmit the "Read Data" communication acting as the "Write Back" information to the memory device M1 in order to potentially store recently read data into the memory device M1 to speed subsequent access to that data.

Figure 7:
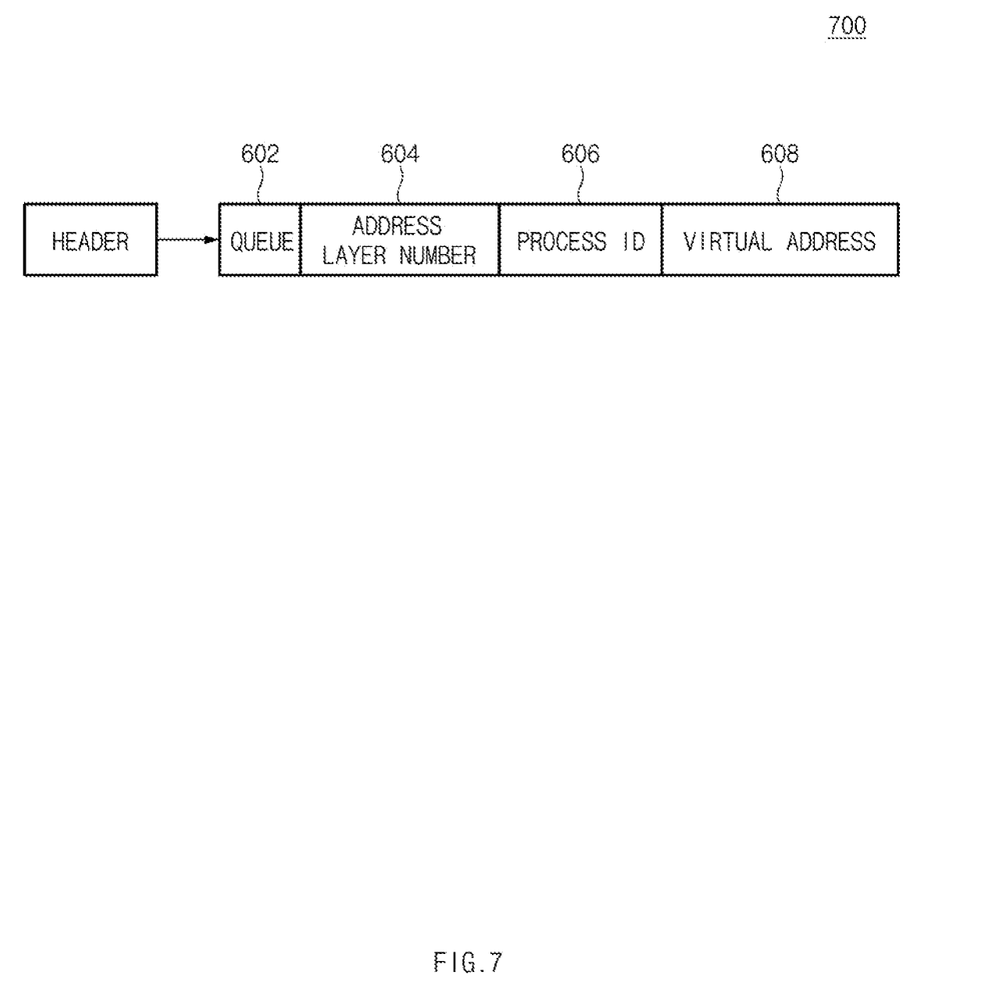
FIG. 7 is a schematic diagram illustrating data request format requested for a memory device shown in FIG. 1 according to an embodiment of the present disclosure.

FIG. 7 is a schematic diagram illustrating an example of a data request format 700 requested for each of the memory devices M1 through M4 shown in FIG. 1 according to an embodiment of the present disclosure. When the "Read Request" information is communicated between the respective memory devices M1 through M4, header information may be formed in a data format 700 shown in FIG. 7, such that the header information provided with the data format of FIG. 7 may be communicated between the respective memory devices M1 through M4.

In an operation corresponding to the "Read Request" information, the data format communicated between the respective memory devices M1 through M4 may include only header information as described with respect to FIG. 6. In this case, the header information may include a queue information field 602, an address layer number field 604, a process ID field 606, a virtual address field 608, etc.

Figure 8:
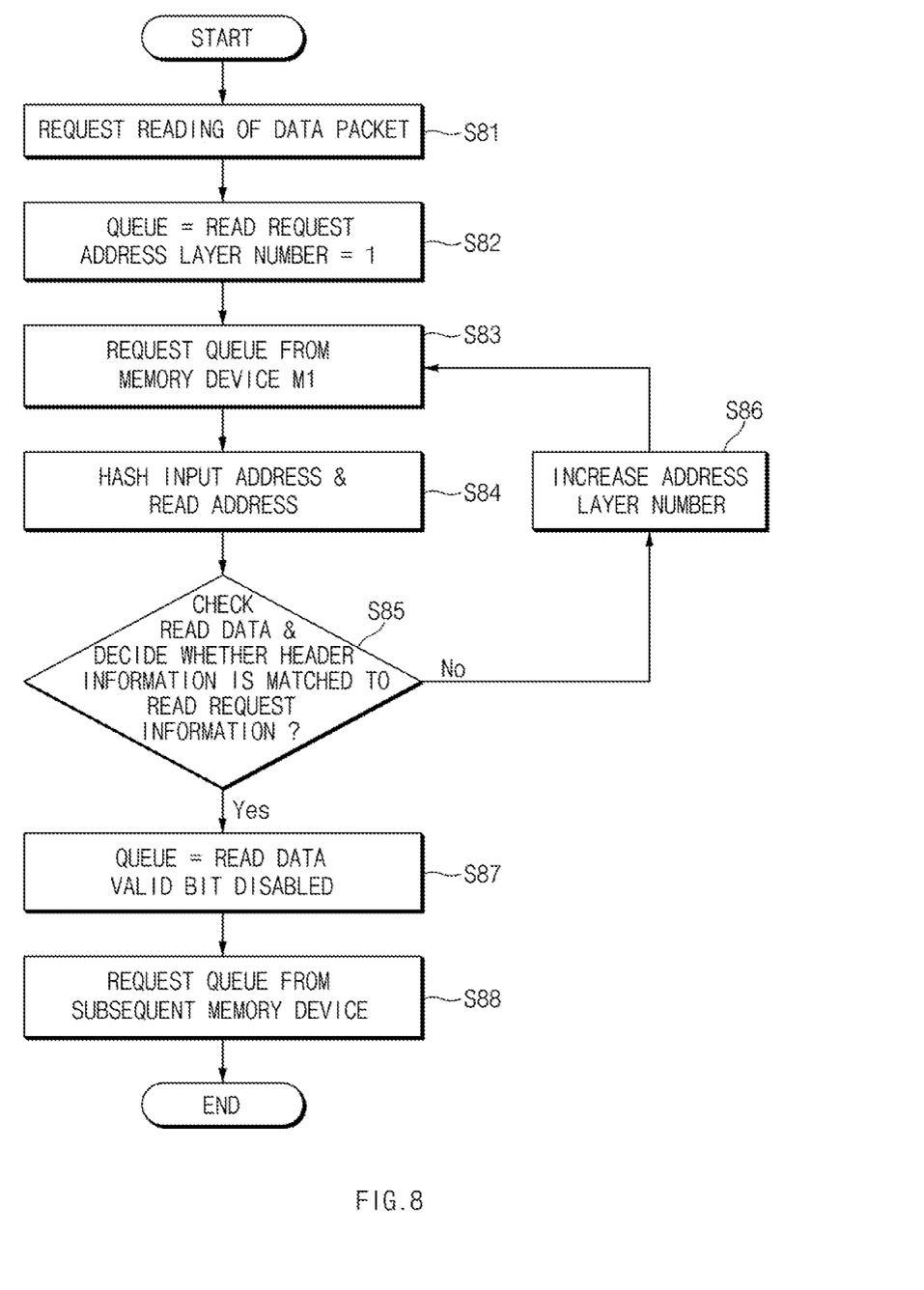
FIGS. 8 and 9 are flowcharts illustrating operations of a memory system according to an embodiment of the present disclosure.

FIG. 8 is a flowchart illustrating operations of the memory system 10 according to an embodiment of the present disclosure. Although an illustrative operation corresponding to the "Read Request" information and an illustrative operation corresponding to the "Read Data" information will hereinafter be described with reference to FIG. 8 for convenience of description and better understanding of the present disclosure, the scope or spirit of the present disclosure is not limited thereto.

As step S81, the memory controller 100 may receive a data packet including the "Read Request" indication from the processor P1 in step S81. In response, at step S82 the memory controller 100 creates header information for transmission to the memory device M1, the header information including a queue field indicating "Read Request", and an address layer number field set to "1". In an embodiment, the header information may also include a process ID and a virtual address each derived from the data packet received by the memory controller 100. At step S83, the memory controller 100 uses the created header information to request a "Read Request" queue from the next memory device, which for the memory controller 100 is the memory device M1.

At step S84, the memory device receiving the "Read Request" may hash a received address, and may read the stored address using the result of the hash. In an embodiment, the received address includes the address layer number field, the process ID, and the virtual address included in the received header information. At step S85, the memory device may check the read data through the header check circuit 250. That is, the header check circuit 250 may determine whether the header information is matched to the "Read Request" information.

If the header information is not matched to the "Read Request" information and valid data is not found in the memory device, and the memory device is one of M1 to M3, at step S86 the address layer number of the read request may increase by one and the read request may then be sent to the next memory device for processing beginning at step S83. For memory devices M1, M2, and M3, the next memory device is memory devices M2, M3, and M4, respectively.

In this way, when valid data is also not found in each of the memory devices M2 and M3, the "Read Request" queue may be finally transmitted up to the memory device M4. If valid data is also not found in the last memory device M4, the "Read Request" queue may be retransmitted to the first memory device M1. That is, for a read request, the memory device M1 is the next memory device for the memory device M4, for the purpose of forwarding an unsatisfied read request. For example, a maximum program loop number may be set in order to prevent an infinite repetition of program loops.

As a result, in the memory device M1, another address different from a first hash address may be designated, by virtue of the increased memory layer number. That is, the address is continuously recomputed in the same manner as in FIG. 4, such that a Read Request being received by a memory device for the second time (by being looped back from memory device M4) will have a different pseudo-random physical than when the read request was first received by the memory device. The address to be hashed in the memory device M1 can be changed within the memory device M1.

On the other hand, when the header information is matched to the "Read Request" information, at step S87, in order to read the stored data from the memory device, the queue field of a data packet may be set to indicate "Read Data", and the read data used as the data of the data packet. In an embodiment, a valid information bit from among the header information of the memory device M1 having found such valid data may be changed to "0" in step S87. In more detail, since valid data has already been read from the memory device M1, the valid information bit of the position that the stored data was read from may be set in such a manner that it is possible to store subsequent input data to that position during a subsequent write operation. In other words, the "Read Data" operation may be a "destructive read" that effectively removes the read data from the memory device.

Thereafter, at step S88 the memory system 10 may transmit a header including a queue field indicating "Read Data" to the next memory device (e.g., the memory device M2 when the present memory device is the memory device M1), and may transmit the read data to the memory device. If data is finally transmitted in this manner to the last memory device M4 and then to the memory controller 100, the memory controller 100 may transmit the data packet of the memory device M4 to the processor that made the read request (e.g., processor P1).

Figure 9:
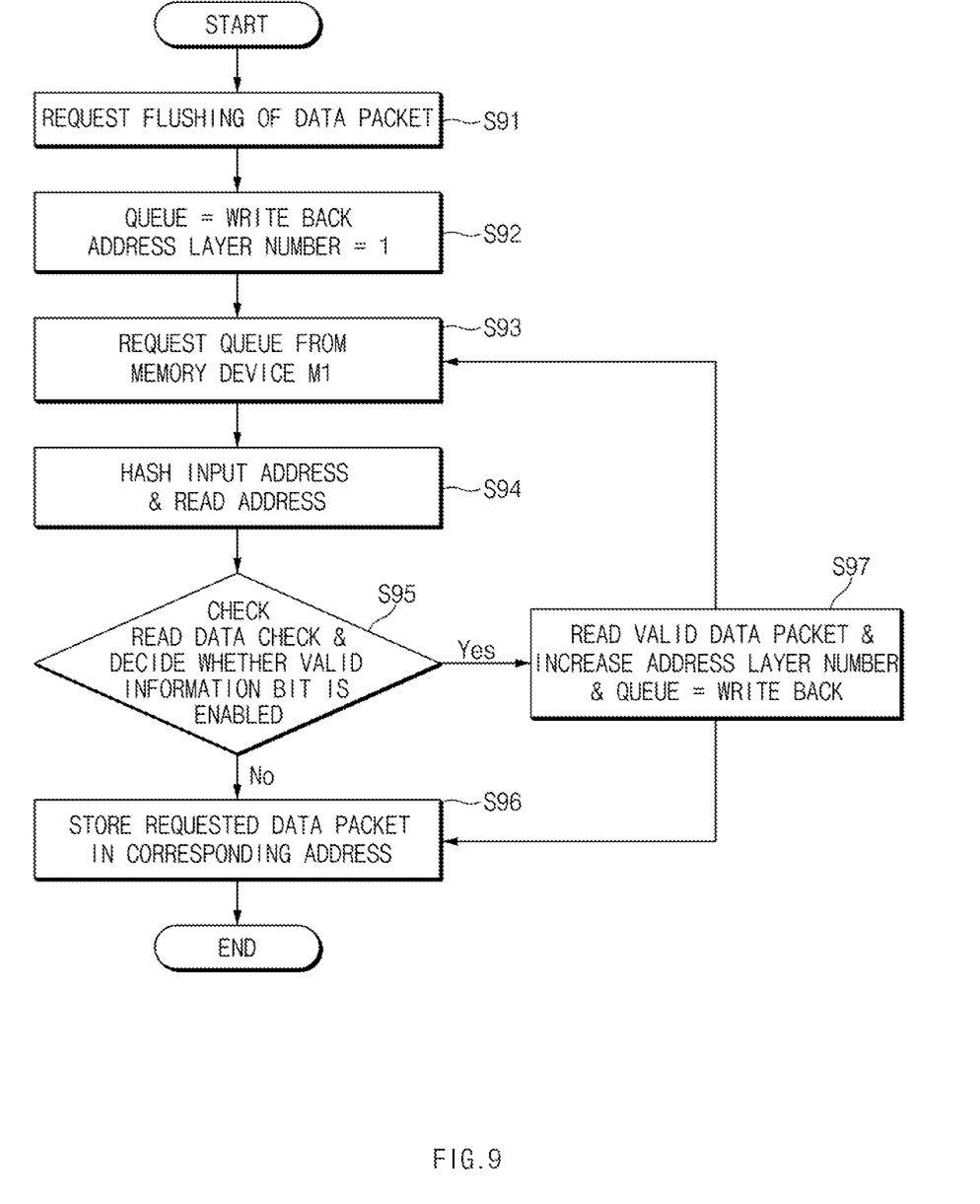

FIG. 9 is a flowchart illustrating operations of the memory system 10 according to an embodiment of the present disclosure. In more detail, FIG. 9 illustrates operations of the "Write Back" operation.

At step S91, The memory controller 100 may receive a data packet provided with a flush request indication from the processor P1. The flush request indication may be a request to potentially flush data prestored in the memory device M1, push the flushed data to the subsequent memory device M2, and store new data received from the processor P1 in the memory device M1.

As a result, at step S92, header information having a queue field indicating "Write Back" and the address layer number set to "1" is transmitted from the memory controller 100 to the memory device M1. In an embodiment, the header information may also include a process ID and a virtual address each derived from the data packet received by the memory controller 100. At step S93, the memory controller 100 may request a "Write Back" queue such that data can be stored in the next memory device, that is, memory device M1.

At step S94, the memory device receiving the "Write Back" request may hash a received address, and may read data at the stored address using the result of the hash. In an embodiment, the received address includes the address layer number field, the process ID, and the virtual address included in the received header information. At step S95, the memory device M1 may check the read data through the header check circuit 250. That is, the header check circuit 250 may check the valid information field of the header information, and may thus determine whether the valid information bit in the data read from the memory device is set to "1" (i.e., an enable state) or "0" (i.e., a disable state).

If the valid information bit has the disable state, at step S95 the memory device proceeds to S96; otherwise the memory device proceeds to S97. At S96, the memory system 10 may store the requested data packet in the corresponding address, and may set the valid information bit to the value of "1" (i.e., the enable state). In contrast, when valid information bit has the enable state, at step S97 the memory device increments address layer number in the header information read from memory device, creates a data packet having the address layer number increases by one, having the processor ID and virtual address read from the memory device, and having the queue field indicating "Write Back", and send the created data packet to the next memory device. The present memory device then proceeds to step S96, and the next memory device then processes the new write back data packet starting at step S93.

That is, during the "Write Back" operation, the memory system 10 may store the requested data in the first memory device M1 located nearest to the memory controller 100. When data is stored in the memory device M1 located nearest to the memory controller 100, the memory system 10 may easily access the memory device M1 in a subsequent data read operation such that the stored data of the memory device M1 can be easily accessed.

The memory system 10 according to this embodiment may check the valid information field of the header information read from the location in the memory device where the requested data is to be stored, and may thus determine the presence or absence of the prestored data in the memory device M1 according to the checked result. When valid data is not present in the memory device M1 in the location where the requested data is to be stored, the memory system 10 may immediately store the requested data in the memory device M1. In contrast, when valid data is present in the memory device M1 in the location where the requested data is to be stored, the memory system 10 may transmit the data that was present in the memory device M1 to the subsequent memory device M2, and may store the requested data in the memory device M1. If valid data is also found in the memory device M2, the memory system 10 may sequentially transmit data to the memory devices M3 and M4 such that the resultant data can be sequentially stored in the memory devices M3 and M4.

Figure 10:
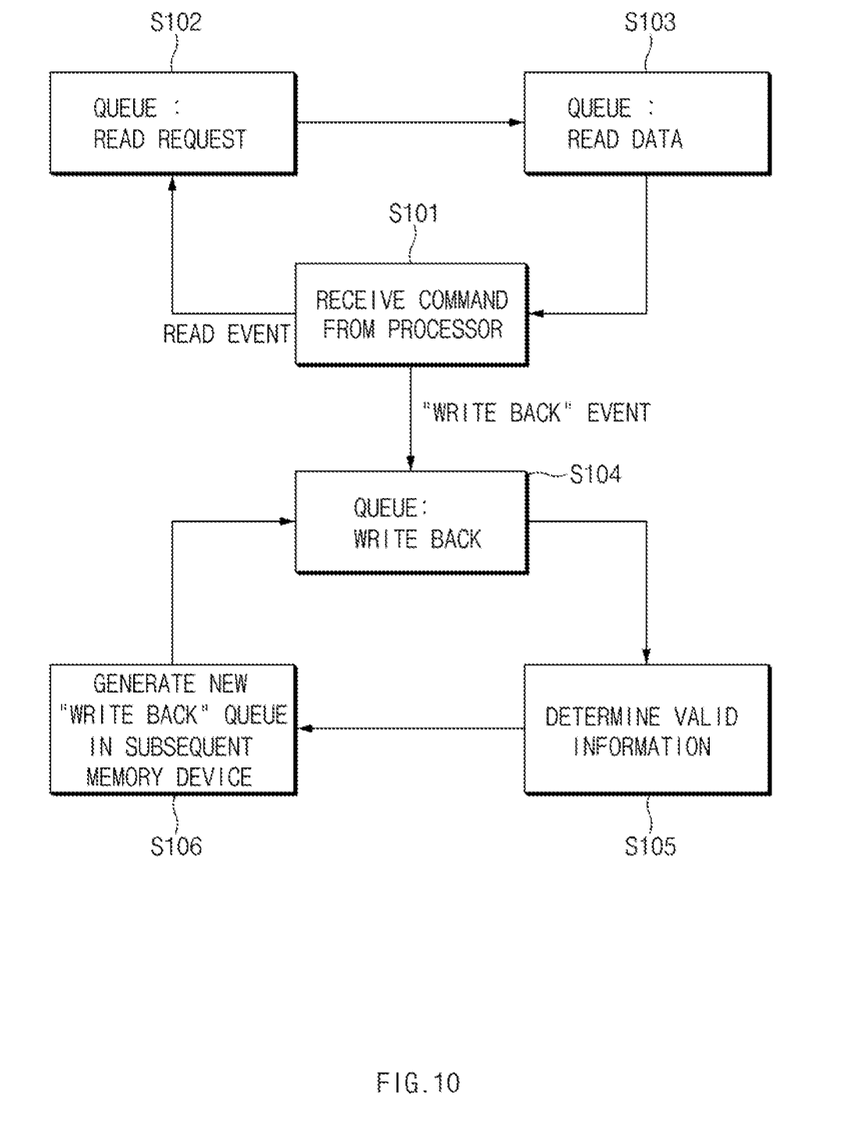
FIG. 10 is a conceptual diagram illustrating queue change of a memory system according to an embodiment of the present disclosure.

FIG. 10 is a conceptual diagram illustrating queue changes of the memory system 10 according to an embodiment of the present disclosure. In more detail, FIG. 10 is a conceptual diagram illustrating a queue change process of header information according to request signals received from the processors P1 through P3.

For example, at step S101 the memory controller 100 may receive a command from the first processor P1 from among the plurality of processors P1 through P3. The processor P1 may request information from the memory control unit 100 by designating the process ID and the virtual address.

In response to receiving the command from the processor P1, the memory controller 100 may transmit a data packet to the memory device M1. The data packet transmitted to the memory device M1 may include data and header information. A value of the queue field contained in the header information of the data packet may be set according to the command from the processor P1.

That is, upon receiving a read event from the processor P1, at step S102 the queue field of the header information may be set to "Read Request". Then, the memory controller 100 may request that the memory device M1 perform the data read operation. If the queue information is changed to "Read Data", the memory controller 100 may read data from the memory device M1 and may transmit the read data to the processor P1 in step S103.

In addition, upon receiving a "Write Back" event from the processor P1, at step S104 the queue field of the header information may be set to "Write Back". At step S105, the memory device M1 may check valid information of the header information so as to determine whether data can be stored in the memory device M1. If it is impossible to store the requested data in the memory device M1 because valid data has already been stored at the pertinent location in the memory device M1, at step S106 the memory system 10 may generate a new "Write Back" queue for a subsequent memory device (e.g., memory device M2).

As is apparent from the above description, the memory system according to the embodiments of the present disclosure may increase a data transfer rate while simultaneously reducing traffic related to data addressing.

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A memory system comprising:
 a plurality of memory devices configured to allow a data packet composed of data and header information to be directly communicated between the plurality of memory devices; and
 a memory controller configured to transmit the data packet to a first memory device from among the plurality of memory devices, and receive the data packet from a second memory device from among the plurality of memory devices, wherein the first memory device and the second memory device are located physically adjacent to the memory controller, from among the plurality of memory devices,
 wherein each of the memory devices is configured to hash the header information to produce a hash address such that the data is accessed, using the hash address, in address regions located at different positions,
 wherein each of the memory devices includes an address hash circuit configured to generate the hash address by hashing an address included in header information of the data packet
 wherein the memory system preferentially stores data in the first memory device, and
 wherein the memory controller and the plurality of memory devices sequentially transmit the data packet in one direction.

2. The memory system according to claim 1, wherein the memory controller is coupled to a plurality of processors through at least one channel, such that the data packet is communicated between the processors through the channel.

3. The memory system according to claim 1, wherein the memory controller includes:
 an interface configured to interface with the processors;
 a controller configured to mediate between an access operation of the first memory device and an access operation of the second memory device;
 a transmitter configured to transmit the data packet received from the controller to the first memory device; and
 a receiver configured to receive the data packet from the second memory device, and transmit the received data packet to the controller.

4. The memory system according to claim 3, wherein the controller transmits the data packet received from the second memory device to any one of the transmitter and the interface.

5. The memory system according to claim 1, wherein each of the memory devices includes:
 a data packet controller configured to establish or change queue information in response to a header check signal;
 a command and address generation circuit configured to generate a command and a physical address in response to the data packet and the hash address;
 a storage circuit configured to store the data packet in response to the command and the physical address; and
 a header check circuit configured to check header information by comparing the header information of the data packet with data read from the storage circuit, and generate the header check signal.

6. The memory system according to claim 5, wherein the data packet controller is configured to check the header information in response to a "Read Request" queue contained in the header information, and change a current queue to a "Read Data" queue when the header information of the data packet is identical to the header information of the data read from the storage circuit.

7. The memory system according to claim 5, wherein the data packet controller is configured to recognize validity information contained in header information of the data read from the storage circuit, and store the data packet in response to a "Write Back" queue when the recognized validity information is disabled.

8. The memory system according to claim 5, wherein:
 when the validity information is enabled, the data packet controller is configured to read a valid data packet by increasing an address layer number, and establish a "Write Back" queue.

9. The memory system according to claim 5, wherein the address hash circuit is configured to generate at least one physical address by hashing header information contained in the data packet.

10. The memory system according to claim 5, wherein the address hash circuit is configured to generate at least one physical address by hashing an address layer number contained in the header information of the data packet, a process identifier (ID) contained in the header information of the data packet, and a virtual address contained in the header information of the data packet.

11. The memory system according to claim 5, wherein the address hash circuit includes:
   a logic operation circuit configured to generate a physical address by performing a logic operation among an address layer number contained in the header information of the data packet, a process identifier (ID) contained in the header information of the data packet, and a virtual address contained in the header information of the data packet.

12. The memory system according to claim 5, wherein each of the memory devices includes:
   a receiver configured to receive the data packet from the memory controller; and
   a transmitter configured to transmit the data packet in response to a data packet transmission signal received from the data packet controller.

13. The memory system according to claim 12, wherein each of the memory devices is configured to bypass the data packet received from the receiver through the transmitter.

14. The memory system according to claim 5, wherein each of the memory devices further includes:
   a buffer circuit configured to buffer the data packet, and transmit buffered data packet to the storage circuit.

15. The memory system according to claim 5, wherein each of the memory devices further includes:
   a data read circuit configured to read data stored in the storage circuit, and transmit the read data to the header check circuit.

16. The memory system according to claim 1, wherein the header information stored in the plurality of memory devices includes at least one of a valid information filed, an address layer number field, a process identifier (ID) field, and a virtual address field.

17. The memory system according to claim 1, wherein the header information communicated between the plurality of memory devices includes at least one of a queue field, an address layer number field, a process identifier (ID) field, and a virtual address field.

18. The memory system according to claim 17, wherein the queue field is set to any one of information of "Read Request", information of "Read Data", and information of "Write Back".

19. The memory system according to claim 1, wherein:
   upon receiving a flush request from the memory controller, the memory system flushes prestored data to the first memory device, and transmits the flushed data to a subsequent memory device; and
   the memory system stores requested data in the first memory device in response to a "Write Back" queue.

* * * * *